US009690603B2

(12) United States Patent
Taniuchi

(10) Patent No.: US 9,690,603 B2
(45) Date of Patent: Jun. 27, 2017

(54) CENTRAL PROCESSING UNIT, INFORMATION PROCESSING APPARATUS, AND INTRA-VIRTUAL-CORE REGISTER VALUE ACQUISITION METHOD

(71) Applicant: NEC Corporation, Minato-ku, Tokyo (JP)

(72) Inventor: Noriyuki Taniuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 14/229,076

(22) Filed: Mar. 28, 2014

(65) Prior Publication Data

US 2014/0298336 A1   Oct. 2, 2014

(30) Foreign Application Priority Data

Apr. 1, 2013 (JP) .................................. 2013-075895

(51) Int. Cl.
| | |
|---|---|
| *G06F 9/00* | (2006.01) |
| *G06F 9/44* | (2006.01) |
| *G06F 9/455* | (2006.01) |
| *G06F 9/30* | (2006.01) |
| *G06F 11/36* | (2006.01) |

(52) U.S. Cl.
CPC .......... *G06F 9/455* (2013.01); *G06F 9/30003* (2013.01); *G06F 11/36* (2013.01)

(58) Field of Classification Search
None
See application file for complete search history.

(56) References Cited

U.S. PATENT DOCUMENTS

| | | | |
|---|---|---|---|
| 2008/0115113 A1 | 5/2008 | Codrescu et al. | |
| 2011/0055528 A1 | 3/2011 | Kondoh et al. | |
| 2012/0246448 A1* | 9/2012 | Abdallah | G06F 9/3012 712/214 |
| 2012/0246450 A1* | 9/2012 | Abdallah | G06F 9/5077 712/216 |

(Continued)

FOREIGN PATENT DOCUMENTS

| | | |
|---|---|---|
| GB | 2483906 A | 3/2012 |
| JP | 2577865 B2 | 2/1997 |
| JP | 2868114 B2 | 3/1999 |

(Continued)

OTHER PUBLICATIONS

The extended European Search Report for EP Application No. EP14161744.9 dated on Jul. 30, 2015.

(Continued)

*Primary Examiner* — Michael Sun

(57) ABSTRACT

To provide a new operation verification method for an information processing flow, a central processing unit capable of building a plurality of virtual cores on a physical core includes: an element or part for executing, on an own virtual core, or causing another virtual core on the same physical core to execute, a reference instruction of directly referring to a current register value used by an arbitrary virtual core from the another virtual core without influence on an execution context of the arbitrary virtual core; and an element or part for switching a permission or authorization for executing the reference instruction of referring to the register value among the plurality of virtual cores.

6 Claims, 12 Drawing Sheets

(56) References Cited

U.S. PATENT DOCUMENTS

2012/0246657 A1* 9/2012 Abdallah .............. G06F 9/5038
                                                          718/102

FOREIGN PATENT DOCUMENTS

| JP | 3206960    | B2 | 9/2001  |
| JP | 2003-85124 | A  | 3/2003  |
| JP | 3867804    | B2 | 1/2007  |
| JP | 2008-310693| A  | 12/2008 |
| JP | 2009-129101| A  | 6/2009  |
| JP | 2011-048616| A  | 3/2011  |
| JP | 2013-058207| A  | 3/2013  |

OTHER PUBLICATIONS

Japanese Office Action for JP Application No. 2013-075895 mailed on Jan. 5, 2017 with English Translation.

* cited by examiner

ADDED INSTRUCTION LIST

| | |
|---|---|
| INSTRUCTION A | STOP OPERATION OF OWN VIRTUAL CORE INCLUDING PROCESSING OF UPDATING REGISTERS SUCH AS MEMORY READ BY MEANS OF SPECULATION AND INTERRUPT. THEN, GENERATE INTERRUPT FOR ACTIVATING ANALYZING VIRTUAL CORE, THEREBY NOTIFYING THAT REGISTER REFERENCE IS READY. |
| INSTRUCTION B | STOP OPERATION OF VIRTUAL CORE HAVING REGISTERS TO BE READ, AND CAUSE VIRTUAL CORE TO TRANSITION TO STATE WHERE REGISTERS CAN BE READ. THIS INSTRUCTION IS BLOCKED UNTIL REGISTERS BECOME READY FOR READ, AND SYNCHRONIZE VIRTUAL CORES WITH EACH OTHER |
| INSTRUCTION C | RESET STOPPED STATE OF SUBJECT VIRTUAL CORE BY INSTRUCTION A OR B |
| INSTRUCTION D | READ CONTENTS OF REGISTERS OF SUBJECT VIRTUAL CORE |
| INSTRUCTION E | REWRITE CONTENT OF DEBUG REGISTER OF SUBJECT VIRTUAL CORE, AND SET BREAK POINT |

FIG. 4

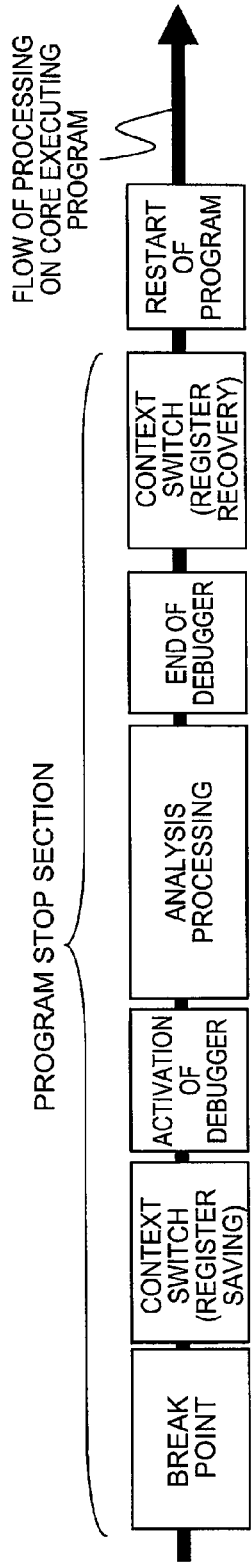
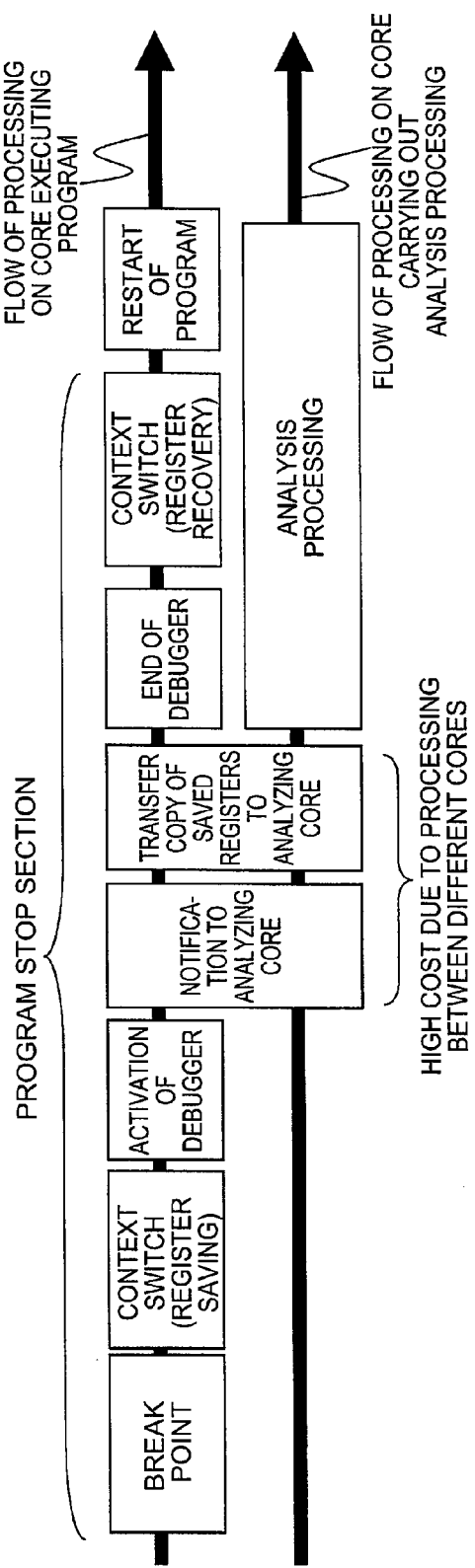
FIG. 8A
FIG. 8B

# CENTRAL PROCESSING UNIT, INFORMATION PROCESSING APPARATUS, AND INTRA-VIRTUAL-CORE REGISTER VALUE ACQUISITION METHOD This application is based upon and claims the benefit of priority from Japanese patent application No. 2013-075895, filed on Apr. 1, 2013, the disclosure of which is incorporated herein in its entirety by reference.

BACKGROUND OF THE INVENTION

1. Field of the Invention

This invention relates to a virtualization technology for using a physical core as a plurality of virtual cores, and more particularly, to a verification technology relating to a program operating on an arbitrary virtual core.

2. Description of the Related Art

In a recent information processing apparatus, a virtualization technology is used to build a plurality of virtual cores for use on a central processing unit (on a physical core) for executing programs.

The virtualization on the central processing unit is referred to as hardware multithreading technology and the like.

By the way, operation verification is carried out for various programs operating on the information processing apparatus by means of various methods.

When a program is debugged, a debugger is usually used for interactive investigation, or investigation is carried out based on static information by means of a memory dump. Any one of these methods influences a behavior of the program subject to the verification (hereinafter referred to as subject program), and is thus hard to use on an operating server or the like. Moreover, when an operating system (OS) itself is in a stalled state, and cannot be operated, the verification methods are further restricted.

If a function of referring to a state of a register or a memory by means of a function of hardware is provided in this case, the function is useful for the verification. The joint test action group (JTAG) and the in-circuit emulator (ICE) already exist as means for providing this function. On the other hand, the JTAG and the ICE are hardware apparatus which are not required for a normal operation, and are not currently implemented on a general server apparatus due to an increase in price and the like except for a special case for a developing application.

Moreover, information on the memory and the register is also accurately acquired from the information processing apparatus itself, and the information processing apparatus itself analyzes the information as the operation verification method for software.

The technologies relating to this invention are described in Japanese Patent No. 3206960, Japanese Unexamined Patent Application Publication (JP-A) No. 2003-085124, Japanese Unexamined Patent Application Publication (JP-A) No. 2008-310693, Japanese Patent No. 3867804, Japanese Patent No. 2577865, Japanese Patent No. 2868114, and Japanese Unexamined Patent Application Publication (JP-A) No. 2009-129101.

A central processing unit (CPU) which can read register information from the outside of a chip is proposed in each of Japanese Patent No. 3206960 and Japanese Unexamined Patent Application Publication (JP-A) No. 2003-085124. When the CPU reads a register content from the outside of the chip, register information copied in advance in a different area is read from the outside in order to avoid a cost for and complexity in synchronizing a register update by an execution context of the operating CPU and an external reference with each other.

Japanese Unexamined Patent Application Publication (JP-A) No. 2008-310693 and Japanese Patent No. 3867804 each propose a coprocessor for passing a register content from a main CPU to an extended arithmetic operation unit for continuing processing.

Moreover, Japanese Patent No. 2577865 proposes a method on a vector processor as an implementation method for sharing a register among CPUs. This is used when high-speed and high-capacity registers exist outside the CPUs, and vector arithmetic operation is carried out by sharing a register area among the plurality of CPUs and cores.

Moreover, Japanese Patent No. 2868114 proposes a method involving simultaneously operating a plurality of OSs on a set of pieces of hardware constituting a single information processing apparatus, and causing an OS for diagnosis to verify a value recorded by a program in a memory.

Moreover, Japanese Unexamined Patent Application Publication (JP-A) No. 2009-129101 describes a failure handling method for causing a plurality of CPUs to operate in parallel, and operating one CPU as a processor core for failure handling.

A memory dump, a debugger, a real time trace, and the like are used as the operation verification method for software.

The memory dump is a method of storing a memory image at a certain stop point of a subject program being executed so that a failure and the like are subsequently analyzed from a content of the memory image. Therefore, the memory dump has such an aspect as not being suitable for tracing a transition of the running location of the program and a change in data and other such analyses.

The debugger operates as if being able to analyze the operating subject program, but the subject program actually needs to be stopped while the debugger is operating, and hence the debugging has various types of influence on the processing operation by the subject program. Therefore, the debugger has such an aspect as not being suitable for analyzing a problem depending on operation timings of a plurality of programs or threads and the like.

Moreover, the debugger cannot be generally used when the OS is in the middle of startup processing, or the OS is stalled due to a certain failure. Moreover, such a kernel debugger as being used while the OS is stalled exists among kernel debuggers, but this is a method for analysis while the kernel is stopped, and hence the kernel debugger has such a problem that the entire OS stops. Therefore, there is such an aspect that the kernel debugger cannot easily be used as the verification method for a system in operation.

The real time trace is a technology of using hardware such as the JTAG and the ICE to investigate a state of a central processing unit (CPU) from the outside, and can be used even when an OS on which a subject program is running is stalled. On the other hand, dedicated expensive hardware needs to be independently implemented. Such hardware needs to be customized in terms of an operation frequency and the number of signals to be investigated depending on a subject circuit. Therefore, the real time trace is low in versatility. The JTAG is implemented on a CPU board in advance on some built-in apparatus, but such a demerit as the dedicated hardware built into the CPU board constituting a wasteful resource during a normal operation exists.

Moreover, in order to read consistent register information from the outside of the physical core on which the subject program is running regardless of an implementation form, the subject core needs to be temporarily stopped, and needs to transition to a debug mode, and then the register information needs to be transferred, and such a problem as a large overhead exists.

Moreover, the following points can be mentioned for describing problems in the operation verification method for software by using the exemplified related arts.

The CPU apparatus described in Japanese Patent No. 3206960 and Japanese Unexamined Patent Application Publication (JP-A) No. 2003-085124 can read register information copied to a different area in advance from the outside of the CPU board.

However, the register value referenced by the apparatus is a past content, and hence even if next analysis processing based on the read content is carried out, the CPU is already executing subsequent processing at this time point, and the CPU apparatus cannot be used for real time debugging.

The coprocessor described in Japanese Unexamined Patent Application Publication (JP-A) No. 2008-310693 and Japanese Patent No. 3867804 passes the register content from the main CPU to the extended arithmetic operation unit side for continuing processing.

However, the coprocessor is dedicated hardware intended to carry out a specific processing such as floating point arithmetic operation. The coprocessor has such a problem as requiring the form of additional provision, and also has a problem in a degree of freedom of the program for verification.

In the implementation method for sharing the register among the CPUs described in Japanese Patent No. 2577865, the high-speed and high-capacity registers needs to be provided outside the CPU. This configuration of the registers may be suitable for an expensive large-scale computer which can include a large amount of expensive memories.

However, the price highly tends to increase, and hence a current general architecture around the CPU cannot employ this configuration.

The verification method for application described in Japanese Patent No. 2868114 can check consistency of output results stored in the memory by the OS for diagnosis.

However, there is such a problem that the register value inside the CPU and the kernel cannot be analyzed.

The various operation verification methods for the subject program have been proposed as described above, but a method which can carry out real-time and detailed verification with less influence on the operation states of the subject program and the OS and less overhead is required.

SUMMARY OF THE INVENTION

In view of the above-mentioned various viewpoints, this invention has an object to provide a central processing unit and an information processing apparatus which can acquire information on a register used by a virtual core with a low overhead, thereby verifying a processing operation by a subject program in operation.

In view of the above-mentioned various viewpoints, this invention has another object to provide an intra-virtual-core register value acquisition method for acquiring information on a register used by a predetermined virtual core by means of an internal operation of a central processing unit with a low overhead, and a verification method for a program which uses the method.

According to an aspect of this invention, there is provided a central processing unit capable of building a plurality of virtual cores on a physical core, including: an element or means for executing, on an own virtual core, or causing another virtual core on the same physical core to execute, a reference instruction of directly referring to a current register value used by an arbitrary virtual core from the another virtual core without influence on an execution context of the arbitrary virtual core; and an element or means for switching a permission for executing the reference instruction of referring to the register value among the plurality of virtual cores.

According to another aspect of this invention, there is provided an information processing apparatus capable of building a plurality of virtual cores at least on a physical core, the information processing apparatus including a central processing unit including: an element or means for executing, on an own virtual core, or causing another virtual core on the same physical core to execute, a reference instruction of directly referring to a current register value used by an arbitrary virtual core from the another virtual core without influence on an execution context of the arbitrary virtual core; and an element or means for switching a permission for executing the reference instruction of referring to the register value among the plurality of virtual cores, the information processing apparatus being configured to execute any one of or a combination of analysis, debug, and parallel processing by using at least the reference instruction for a program as a subject, which uses at least one, which is equal to or less than a maximum number of the virtual cores, of the plurality of virtual cores on the same physical core as a program execution entity, from an OS operating while considering at least one of the plurality of virtual cores as an execution entity.

According to yet another aspect of this invention, there is provided a method of acquiring a register value in a virtual core by means of an internal operation of a central processing unit, the method including, in an environment in which a plurality of virtual cores are built on a single physical core: enabling a setting of possibly providing another virtual core belonging to the same physical core with a permission or authentication of referring to a register used by an arbitrary virtual core; and executing, by another arbitrary virtual core belonging to the same physical core, a reference instruction of directly referring to a current register value used by the arbitrary virtual core from another virtual core on the same physical core without influence on an execution context of the arbitrary virtual core, thereby identifying, by the another arbitrary virtual core, the referenced current register value used by the arbitrary virtual core.

According to still another aspect of this invention, there is provided a verification method for a program, including: building a plurality of virtual cores on a single physical core, and enabling a setting of possibly providing another virtual core belonging to the same physical core with a permission for referring to a register used by an arbitrary virtual core; in an environment in which the plurality of virtual cores are built on the single physical core and the setting is enabled, executing, for a program as a subject, which uses at least one, which is equal to or less than a maximum number of virtual cores, of the plurality of virtual cores on the same physical core as a program execution entity, from an OS operating while considering at least one of the plurality of virtual cores as an execution entity, a reference instruction of directly referring to a current register value used by an arbitrary virtual core from another virtual core on the same physical core without influence on at least an execution context of the arbitrary virtual core; and executing any one or a combination of analysis, debug, and parallel processing by using the register value of the virtual core acquired by using the reference instruction.

According to another aspect of this invention, it is possible to provide the central processing unit and the information processing apparatus which can acquire the information on the register used by the virtual core with a low overhead, thereby verifying the processing operation by the subject program in operation.

According to a further aspect of this invention, it is also possible to provide the intra-virtual-core register value acquisition method for acquiring information on the register used by the predetermined virtual core by means of the internal operation of the central processing unit with a low overhead, and the verification method for a program which uses the method.

BRIEF DESCRIPTION OF THE DRAWINGS

The above features and advantages of this invention will be more apparent from the following description of certain embodiments taken in conjunction with the accompanying drawing, in which:

FIG. 4 is an explanatory diagram exemplifying a CPU instruction configuration additionally implemented according to the embodiment of this invention;

FIGS. 8A and 8B are explanatory diagrams each illustrating an example of a debug processing operation flow when a reference instruction according to this invention is not used;

DETAILED DESCRIPTION OF THE PREFERRED EMBODIMENT

Figure 1:
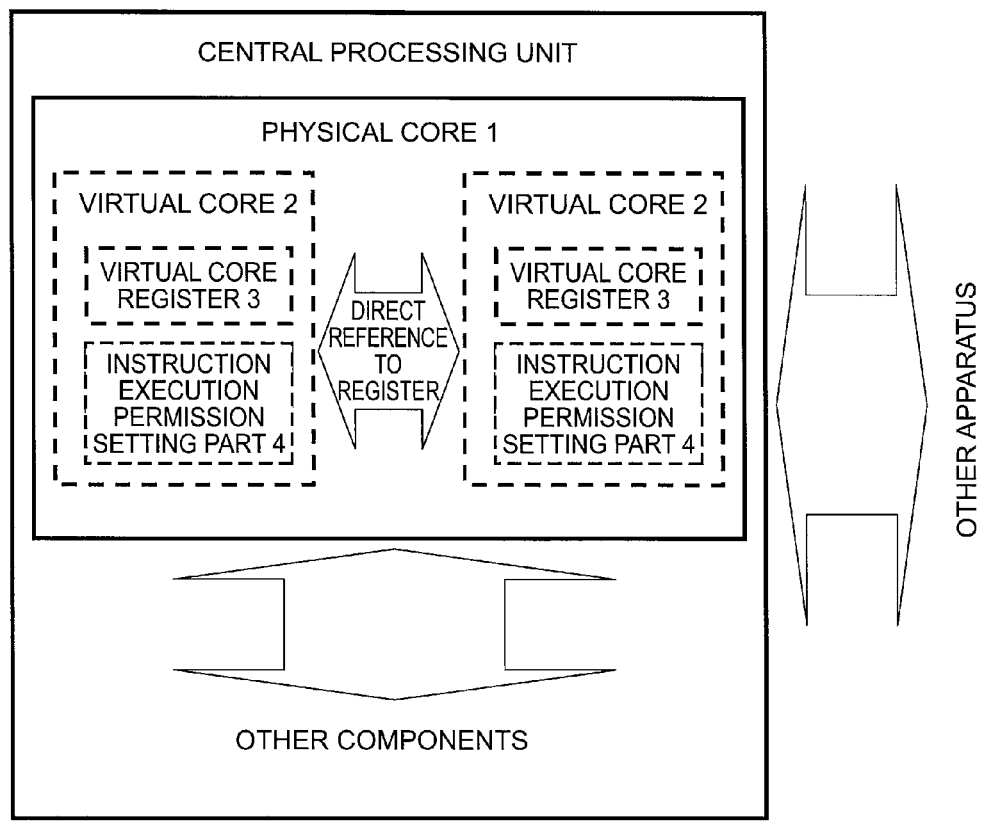
FIG. 1 is a block diagram illustrating a concept of a central processing unit according to an embodiment of this invention.

A description is now given of an embodiment of this invention referring to the drawings.

FIG. 1 is a block diagram logically illustrating a part or an element of a central processing unit according to the embodiment of this invention. Two virtual cores 2 are built on a physical core 1 in the illustrated part of the central processing unit (CPU).

A virtual core register 3 and an instruction execution permission setting part 4 are provided on each of the virtual cores 2. The respective virtual cores 2 do not always need to have corresponding configurations.

One of the virtual cores 2 can be operated as means for executing, on the own virtual core 2, or causing the other virtual core 2 to execute, a reference instruction of directly referring to a current value of the virtual core register 3 used by the other virtual core 2 without influence on an execution context of the other virtual core 2. Moreover, the virtual core 2 can be used for a general usage of operating an OS, an application, and the like.

The virtual core register 3 is provided as a physical register in the physical core 1 to be used by each of the virtual cores 2, and is used for a processing operation of a program. Moreover, when an OS or an application is operated as the general usage in association with each of the virtual cores 2, the virtual core register 3 is used as an exclusive storage resource for the associated virtual core 2.

Moreover, when the reference instruction of directly referring to a current register value used by an arbitrary virtual core 2 is executed on the other virtual core 2, the arbitrary virtual core 2 logically receives the reference to the value from the another or different virtual core 2.

The instruction execution permission setting part 4 can be operated as means or an element for switching a permission or authentication for executing the reference instruction of referring to the register value among the virtual cores 2. The means or element may set capability of receiving the reference instruction and the like or may set capability of notifying the reference instruction and the like. Moreover, the means or element may set a relationship with an arbitrary virtual core, thereby switching validity of the setting.

The virtual core technology is a technology of concurrently running threads virtually assigned to the respective virtual cores 2 on an execution pipeline of the physical core 1. The physical core 1 is a single core in terms of the physical chip implementation. Therefore, the virtual core registers 3 are mutually close in physical arrangement (wiring) distance, and can achieve data transfer at a high speed in the registers as compared with data transfer to an external memory component. In other words, the cost is very low.

Moreover, each of instructions (each of instructions handled by each of the virtual cores 2) to which the instruction execution permission setting part 4 sets the permission is processed at a higher speed than the OS and the applications.

Furthermore, the virtual cores 2 are on the same physical core, and hence a cost for synchronizing respective execution threads is very low in comparison with a case where the execution threads are synchronized between different physical cores.

In an information processing apparatus according to this invention, characteristics of the virtualization technology are used to implement the CPU instruction of referring to a resource such as the register originally used exclusively from another virtual core as the reference instruction, thereby acquiring a value of the virtual core register 3 built for an arbitrary virtual core with a small overhead.

In addition, some CPU instructions are additionally implemented along with the reference instruction in order to effectively use the reference instruction. These instructions may be realized by a signal CPU instruction, or may be divided and implemented by a plurality of instructions. Moreover, a combination of the following plurality of CPU instructions may be prepared depending on a usage and a timing of use.

- Reference preparation instruction of stopping processing on the own virtual core
- Reference preparation instruction of stopping processing on another virtual core
- Reference preparation reset instruction of resetting a state stopped by the reference preparation instruction
- Setting instruction of setting a point of issuing the reference instruction
- Setting instruction of setting a point of issuing the reference preparation instruction
- Setting instruction of setting a point of issuing the reference preparation reset instruction
- Setting instruction of setting a point of causing issuance of the reference instruction
- Setting instruction of setting a point of causing issuance of the reference preparation instruction
- Setting instruction of setting a point of causing issuance of the reference preparation reset instruction
- Setting instruction of setting an instruction execution permission The instruction execution permission setting part 4 is configured to be able to set whether the reference instruction is to be received or not as well as whether the above-mentioned respective instructions are to be received or not. The permission or authentication may be set to each of the instructions, or the permission may be set to receive the instructions integrally as a reference instruction set, thereby executing the reference instruction. Moreover, in order to prepare for a case in which three or more virtual cores are built on the physical core, the instruction execution permission setting part 4 may be built to set a permission for only an arbitrary virtual core to execute the respective instructions.

The central processing unit for executing the CPU instructions is installed in the information processing apparatus. A program virtually using one or more of the plurality of virtual cores on the same physical core as a program execution entity is considered as a subject program, and the processing operation of the subject program in operation is verified. A program for verification can use programs at various levels, and may properly generate a program depending on a usage to be verified. On this occasion, the program for verification may independently cause the computer to function for a desired usage, or may be built into the OS or an application, thereby using the program for verification to verify the program itself or another program to be operated on the computer.

On this occasion, when analysis, debug, parallel processing, and the like are carried out for verification by using the reference instruction and the like by a virtual core different from a virtual core which runs the verification program among the plurality of virtual cores constituted in the single physical core, or by an OS operating on the plurality of virtual cores, the verification program can be a highly convenient tool.

Data accessed immediately before by a virtual core on which the verification subject has operated is highly likely to exist in a cache of the CPU shared among the virtual cores. The verification can thus be carried out without accessing to a main memory which is relatively low in speed, and a large amount of appropriate information can be acquired.

In the following, some configurations of a program verification system are mentioned in order to describe operations of the central processing unit. Note that, these configurations do not limit the configuration of the verification system.

Hereinafter, a virtual core on which the program subject to verification (subject program) runs is referred to as analyzed virtual core, and a virtual core on which the program (analyzing program) for carrying out the operation verification on the subject program runs is referred to as analyzing virtual core. The analyzed virtual core and the analyzing virtual core are built on the same physical core.

(1) Operation configuration example of analyzed virtual core and analyzing virtual core
- Configuration example 1 . . . Different OSs are respectively operated on the analyzed virtual core and the analyzing virtual core.
- Configuration example 2 . . . The same OS is operated on the analyzed virtual core and the analyzing virtual core, and an analyzing process resides on the analyzing virtual core.
- Configuration example 3 . . . The same OS is operated on the analyzed virtual core and the analyzing virtual core, and a verification code executed in response to a setting instruction of notifying the reference instruction is registered in advance to the analyzing virtual core.

(2) Operation configuration example in which resource partitioning is carried out in the single physical core in order to operate different OSs on the respective virtual cores, and different I/O controllers are assigned to the respective OSs.
- Embodiment Mode 1 . . . A plurality of I/O controllers are implemented in the CPU, and a main OS and an analyzing OS respectively use I/O controllers physically different from each other.
- Embodiment Mode 2 . . . A single I/O controller is used as a plurality of I/O controllers logically by means of the logical partitioning (LAPR), thereby causing the main OS and the analyzing OS to share the I/O controller.

(3) Processing operation example using register reference function from verifying virtual core
- Embodiment Mode 1 . . . A break point is set to read and use register information under an arbitrary condition.
- Embodiment Mode 2 . . . Real time trace by periodic sampling from the analyzing virtual core side
- Embodiment Mode 3 . . . Parallel processing where the virtual cores on the same physical core mutually refer to registers, thereby using the register reference function as a high-speed inter-process communication
- Embodiment Mode 4 . . . Performance bottleneck investigation by using low overhead of event notification function For example, in the processing operation according to Embodiment Mode 1, when the analyzed virtual core operates in accordance with the subject program, and reaches a break point, the analyzing program notifies the analyzing virtual core of a predetermined instruction, and the analyzing virtual core side uses the reference instruction to read an architecture state such as a program counter and an instruction register by using the reference command. Therefore, the processing can be used in place of conventional verification processing which transitions to a debug mode.

The implemented function is used to directly refer from the analyzing virtual core to the register of the analyzed virtual core, and execution of operations such as register save and debugger start by means of the context switch can thus be omitted on the analyzed virtual core. Therefore, an overhead caused by register reference processing is very small, and processing can be immediately resumed after the acquisition of the register information on the analyzed virtual core is finished.

Moreover, a physical configuration and a logical configuration of the central processing unit constituting the analyzing virtual core are general-purpose configurations, and hence the central processing unit can be used as a conventional logical processor unit when the central processing unit is not used for the verification, or when processing required for the verification is not carried out.

From another point of view, a part of resources of the general-purpose virtual processor are used for the verification processing, and such an advantage that the resources are not wasted compared with the conventional technology of implementing dedicated verifying/analyzing hardware inside/outside the CPU is provided.

As described above, when the verification for the subject program is carried out, by executing the subject program on a certain virtual core on the same physical core of the CPU, and operating the debugger on another virtual core, the register value can be observed on the another virtual core without stopping the program subject to the analysis for a long period.

For the verification, a description is given of the respective program verification methods by using the information processing apparatus according to the embodiment while more detailed implementation configurations and operation examples are described. In the following, a detailed description is given of two processing forms. One of the forms is a form where different OSs are operated respectively on a virtual core on which the analyzed program is executed and on a virtual core on which a debugger is operated. The other of the forms is a form where the same single OS is operated on both the virtual cores.

A description is first given of the form where the different OSs are operated on the virtual core on which the subject program is executed and the analyzing virtual core.

In the description of this example, the virtual cores on the same physical core are respectively considered as a virtual core for server OS and a virtual core for analysis, and different OSs are operated on the respective virtual cores by means of resource partitioning.

The resource partitioning is an existing technology of providing a CPU, a memory, I/O devices, and the like with access control, and permitting access to resources required by each OS, thereby assigning the access right to the hardware resources to an OS in need in order to operate a plurality of OSs on a single piece of hardware.

This example is useful for analyzing a kernel. Even if the OS operating on the virtual core for server OS is restricted in operation due to the ongoing startup or ongoing stall, a behavior of the kernel subject to analysis can be investigated via the OS independently operating on the analyzing virtual core for analysis.

The other form is a form where a process is considered as the analysis subject, and the same single OS is operated on both the analyzing and analyzed virtual cores.

In this example, the analysis processing is carried out by operating an analyzed process on one virtual core and assigning an analyzing process to another virtual core on the same physical core.

This example cannot be used while the OS is staring up, or is stalled, but has an aspect in which the implementation is easy, and is better in utility than the above-mentioned example. This example is thus advantageous when the analysis subject is not the kernel but the process.

[Example of Configuration]

Figure 2:
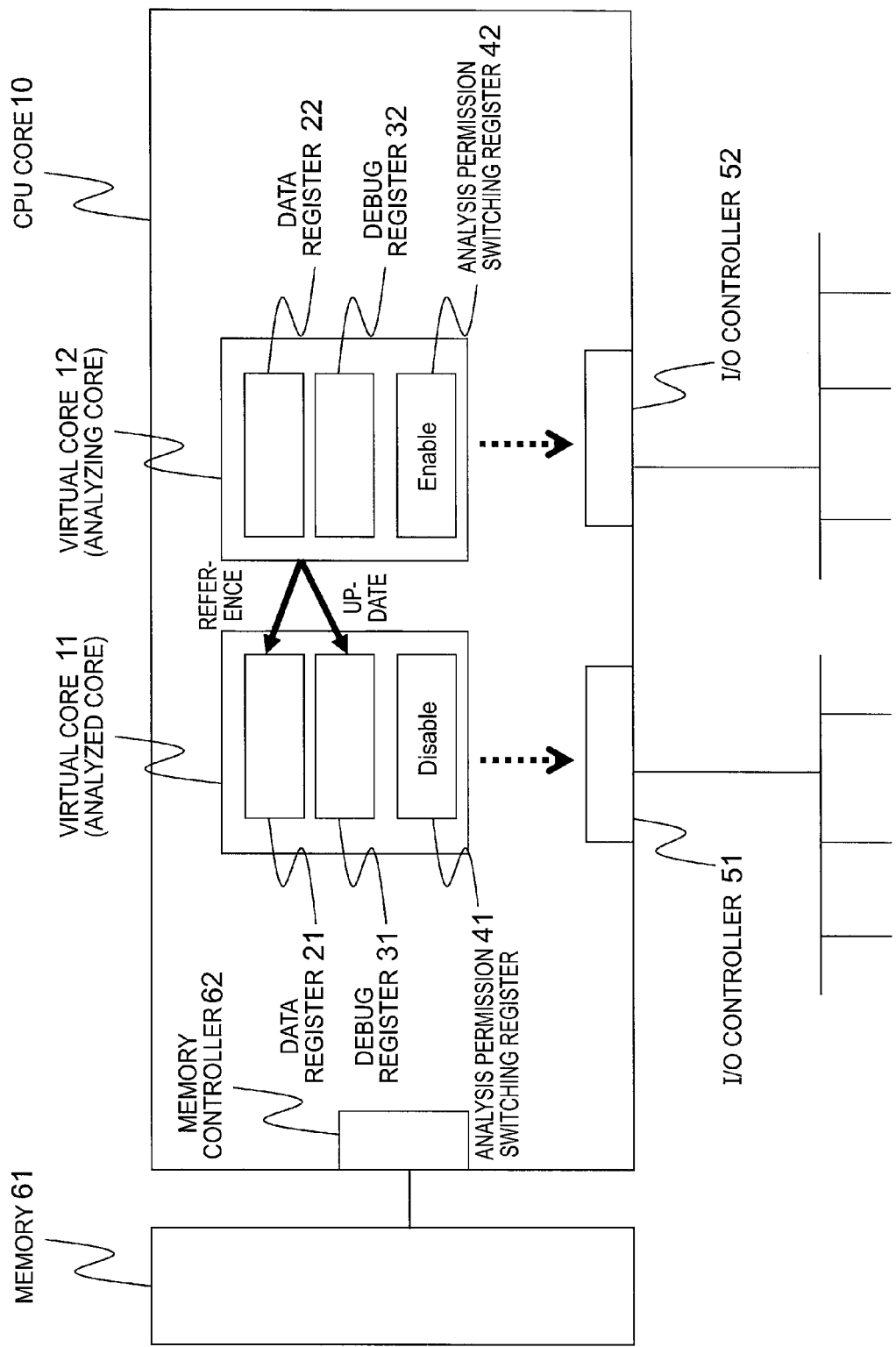
FIG. 2 is a block diagram illustrating a conceptual configuration of a CPU peripheral architecture including a register reference function for another virtual core.

FIG. 2 is a block diagram illustrating a conceptual configuration of the CPU core having the function of referring to a register of another virtual core.

A CPU core 10 operates as the central processing unit of the server apparatus, and includes virtual cores 11 and 12, which are recognized as independent cores from the outside of the CPU.

The virtual core 11 is the analyzed virtual core, and operates the server OS. The virtual core 12 is an analyzing virtual core, and operates the debugger. Entities of these virtual cores are threads sharing an execution pipeline, and respectively include dedicated registers (such as data registers 21 and 22) for holding the architecture states.

The virtual cores 11 and 12 respectively include registers (analysis permission switching registers 41 and 42) for independently switching the reference function between Enable and Disable, and controlling access rights of the other virtual core to the registers depending on contents thereof.

The analysis permission switching register 42 of the virtual core 12 is set to Enable in the configuration illustrated in FIG. 2, and hence the virtual core 12 can refer to the data register 21 of the virtual core 11, and can update a debug register 31. On the other hand, the analysis permission switching register 41 of the virtual core 11 is set to Disable, and hence and the virtual core 11 does not have a permission to make access to the register of the virtual core 12.

In the method in which the different OSs are operated respectively on the virtual core for server OS and the analyzing virtual core, I/O controllers 51 and 52 are implemented on the respective virtual cores, and are independently managed. A reason for managing the I/O controllers independently for the respective OSs is that if a single I/O controller is managed by a plurality of OSs, an interrupt caused by an I/O, reset processing, and the like influence the other OSs, resulting in possible confusion. A memory controller 62 is shared by the virtual cores 11 and 12, and controls access rights for respective areas assigned to the individual virtual cores, thereby enabling the respective OSs to use the areas.

The existing LPAR technology can be used as another implementation example relating to the I/O controller. The LAPR is a technology of logically partitioning hardware so that the I/O controller behaves as if a plurality of I/O controllers exist. When the LPAR is used, the virtual cores 11 and 12 can share a single physical I/O controller, and hence it is not necessary to implement independent I/O controllers for the respective virtual cores 11 and 12.

Figure 3:
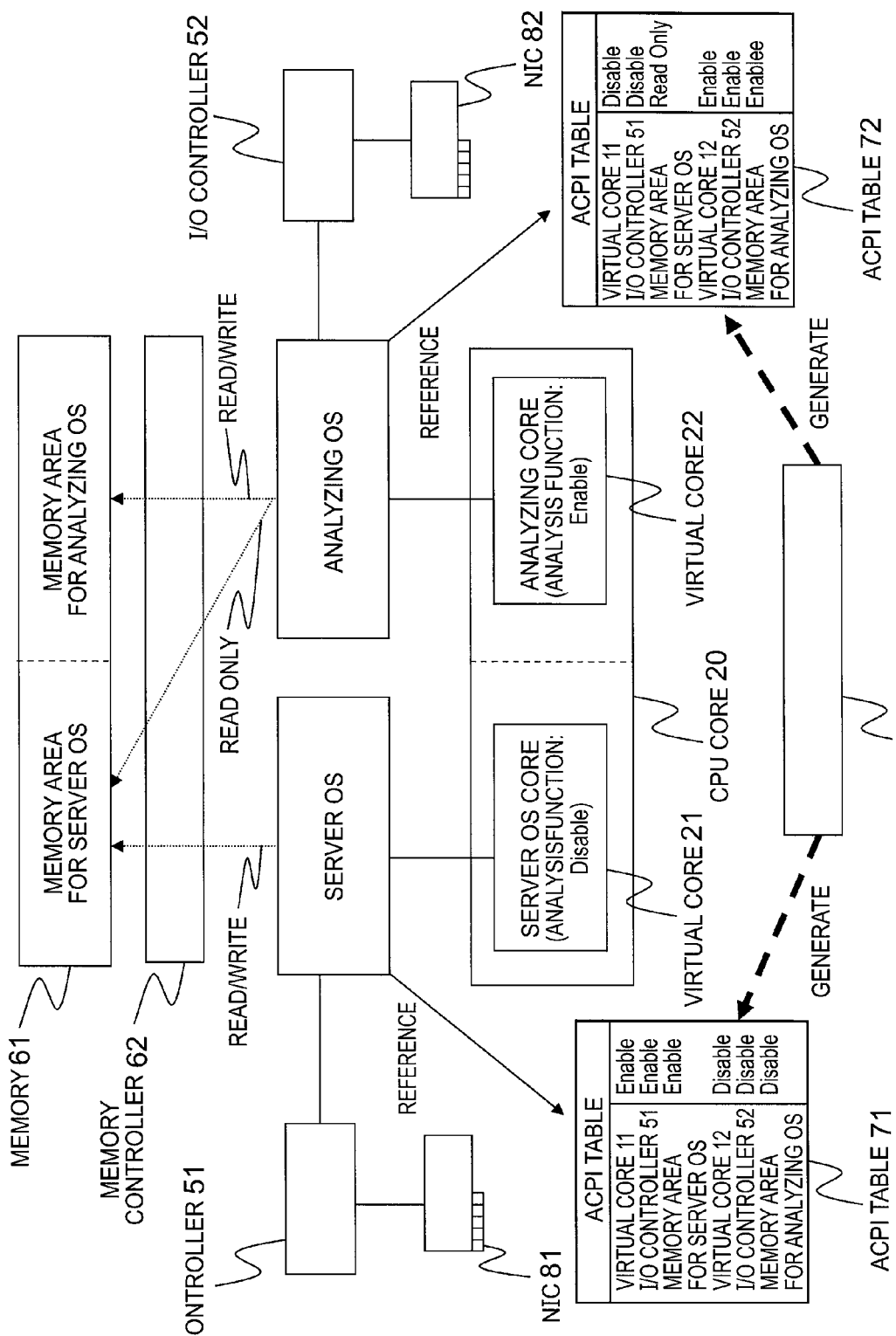
FIG. 3 is a block diagram illustrating another conceptual configuration of the CPU peripheral architecture including the register reference function for another virtual core.

FIG. 3 illustrates the resource partitioning of partitioning into the server OS and the analyzing OS according to the embodiment mode. The resource partitioning is realized by a BIOS 70 generating advanced configuration and power interface (ACPI) tables different in configuration for the respective OSs. Identifiers of different ACPIs are respectively assigned to the virtual cores 21 and 22 realized in the CPU core 10, internal structure thereof are hidden, and the respective operating OSs recognize the virtual cores 21 and 22 as different cores.

The BIOS 70 generates an ACPI table 71 for the server OS. Areas to be assigned to the server OS out of the virtual core 11, the I/O controller 51, and a memory 61 for the server OS core are enumerated as Enable in the ACPI table 71. The server OS refers to the ACPI table 71, initializes the respective resources, and activates the OS.

On the other hand, the BIOS 70 generates an ACPI table 72 for the analyzing OS. Areas to be assigned to the analyzing OS out of the virtual core 12, the I/O controller 52, and the memory 61 for the analyzing OS core are enumerated as Enable in the ACPI table 72. As a difference from the ACPI table 71 for the server OS, the analyzing OS is permitted only to read the memory of the server OS. This is because the memory on the server OS side also needs to be referred to for the analysis processing. The analyzing OS initializes the respective resources based on the information, and activates the OS.

Network interfaces such as NICs 81 and 82 are respectively connected to the I/O controllers 51 and 52, thereby connecting the respective OSs to the outside for operation independently of the states of the OSs.

A description is now given of CPU instructions implemented on the CPU according to the embodiment.

FIG. 4 enumerates CPU instructions added in this embodiment. Each of the enumerated instructions is an instruction group constituted by combining some of the above-mentioned instructions, and changes such as unification, division, and specification of reference range may be made depending on a purpose of use.

An instruction A is a reference preparation instruction of causing an arbitrary virtual core to prepare for reference to a register, and moving the processing to another virtual core. The virtual core (own virtual core) which has executed the instruction A stops all pieces of processing which can change registers such as a speculative load and an interrupt in order to read consistent information. Moreover, the virtual core waits until registers during update are stabilized in terms of electrical signal, and after transitioning to a state where the registers can be read, asserts and notifies an interrupt signal to the analyzing virtual core. The instruction A needs to be executed mainly when a break point set in a program is reached and a debug exception is generated, but may be executed at an arbitrary timing.

An instruction B is a reference preparation instruction of stopping another virtual core, and causing the another virtual core to transition to a state where registers can be read. The instruction B is issued by a virtual core on the analyzing side to a virtual core on the analyzed side. The instruction B imposes waiting until the virtual core subject to analysis completes the preparation for the register reference, and thus also serves to block the executing virtual core.

An instruction C is a reference preparation reset instruction of resuming processing operation by a virtual core which is stopped by the instruction A or B.

An instruction D is a reference instruction of reading a content of an arbitrary register from a subject virtual core.

An instruction E is a setting instruction of rewriting a content of the debug register of a subject virtual core. The instruction E is used to control a timing for generating the instruction A by a virtual core side which carries out the analysis by setting a hardware break point.

A supplementary description is now given of how to use the instruction E. A break point is set in order to issue the instruction A at a timing when a certain condition is satisfied such as a timing when an instruction at a specified address is executed, or a data at a specified address is accessed.

The break point includes a software break point set by the debugger and a hardware break point set by using the debug register. Both of the break points are the same in such a point as to generate a debug exception, but in the form where different OSs are operated on respective virtual cores, a software break point cannot be set for a program on another OS by using an existing instruction set, and only a hardware break point can be used. Moreover, even in the form where the same OS is operated on respective virtual cores, if a program subject to analysis is running, it is difficult to set a software break point afterwards. Therefore, the instruction E is used in order to provide such control from the outside as to issue the instruction A under an arbitrary condition independently of the state of the subject virtual core.

Figure 5:
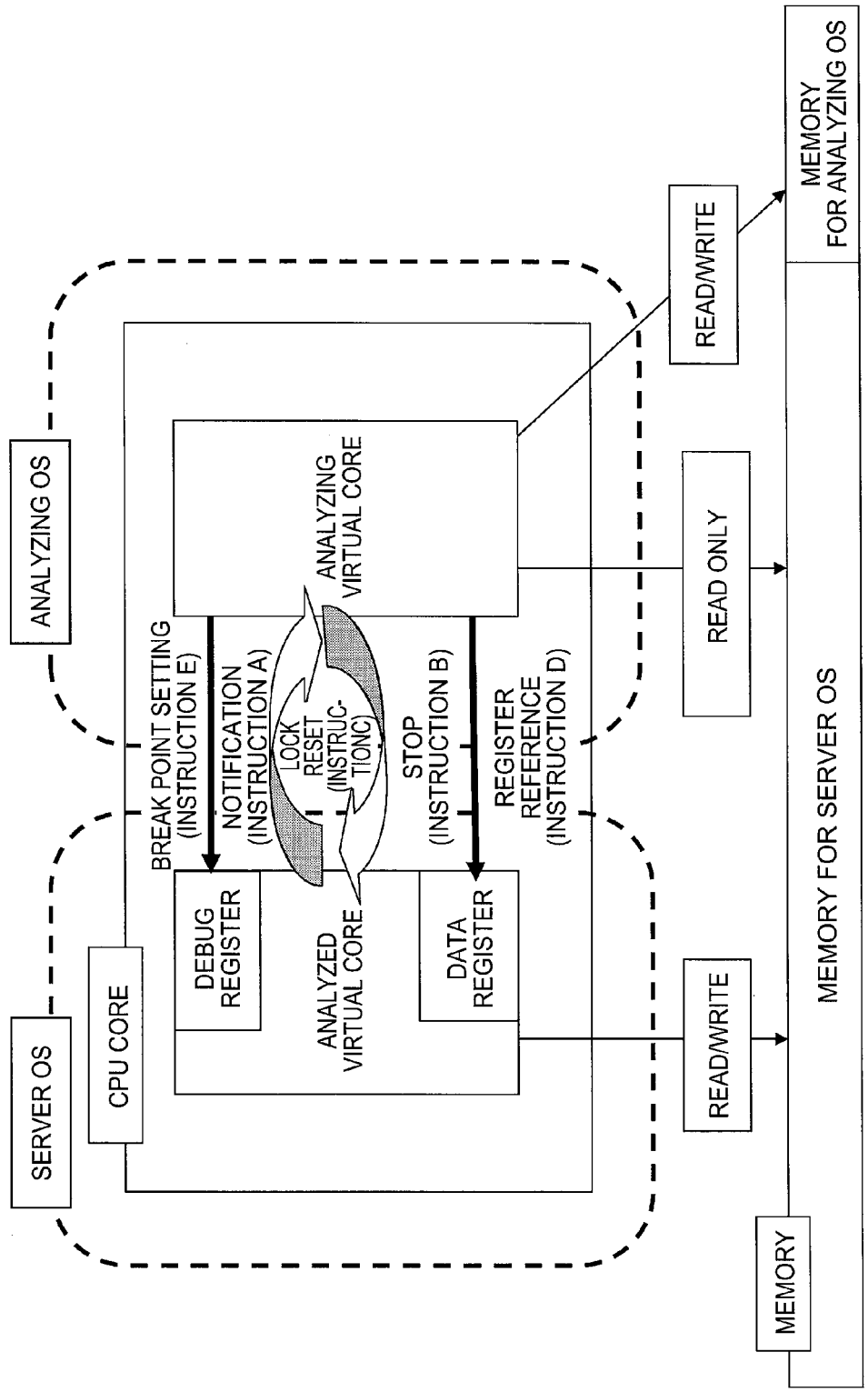
FIG. 5 is an explanatory diagram illustrating a processing operation form of operating different OSs on respective virtual cores.
Figure 6:
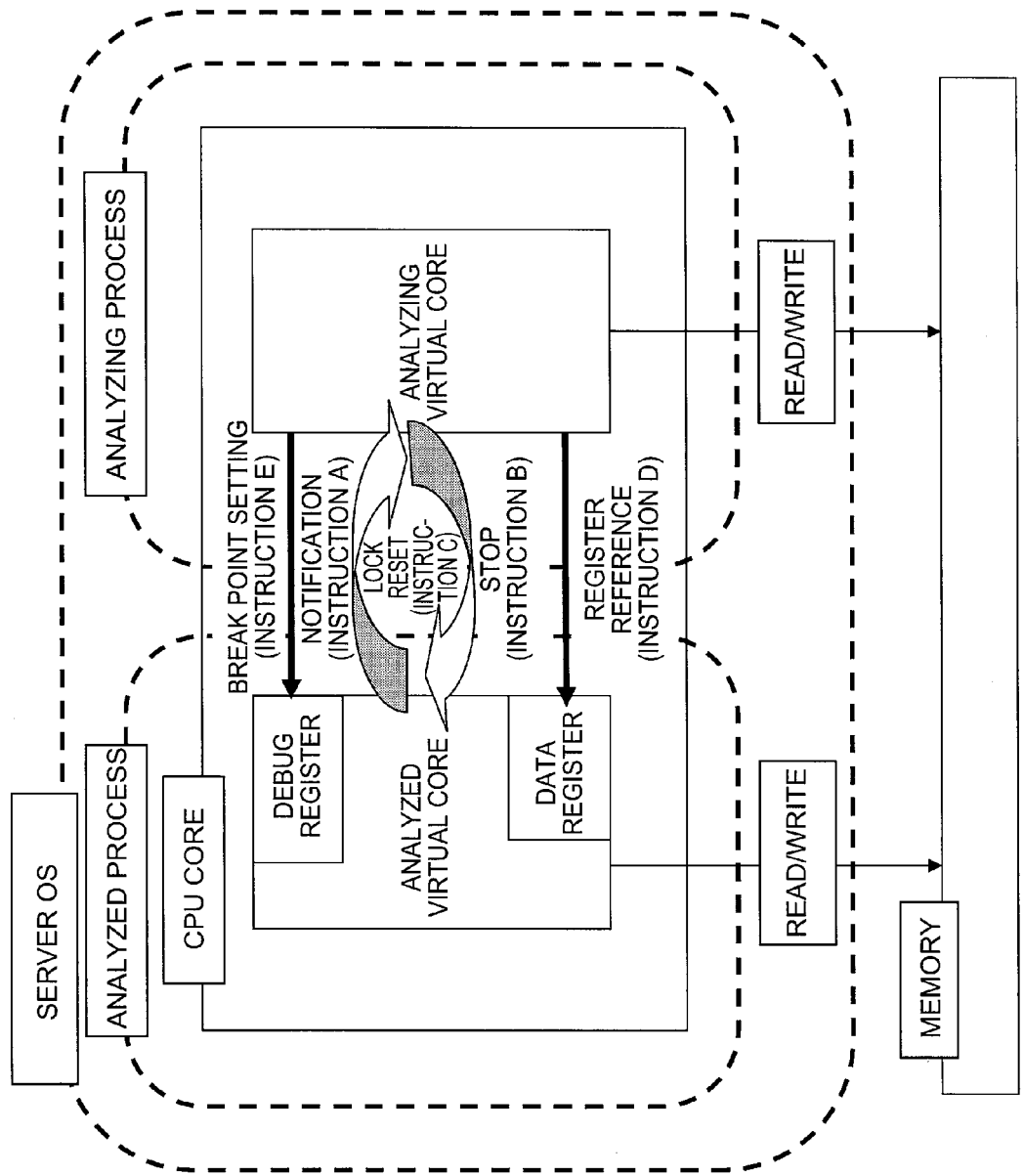
FIG. 6 is an explanatory diagram illustrating a processing operation form of operating the same OS on a plurality of virtual cores.
Figure 7:
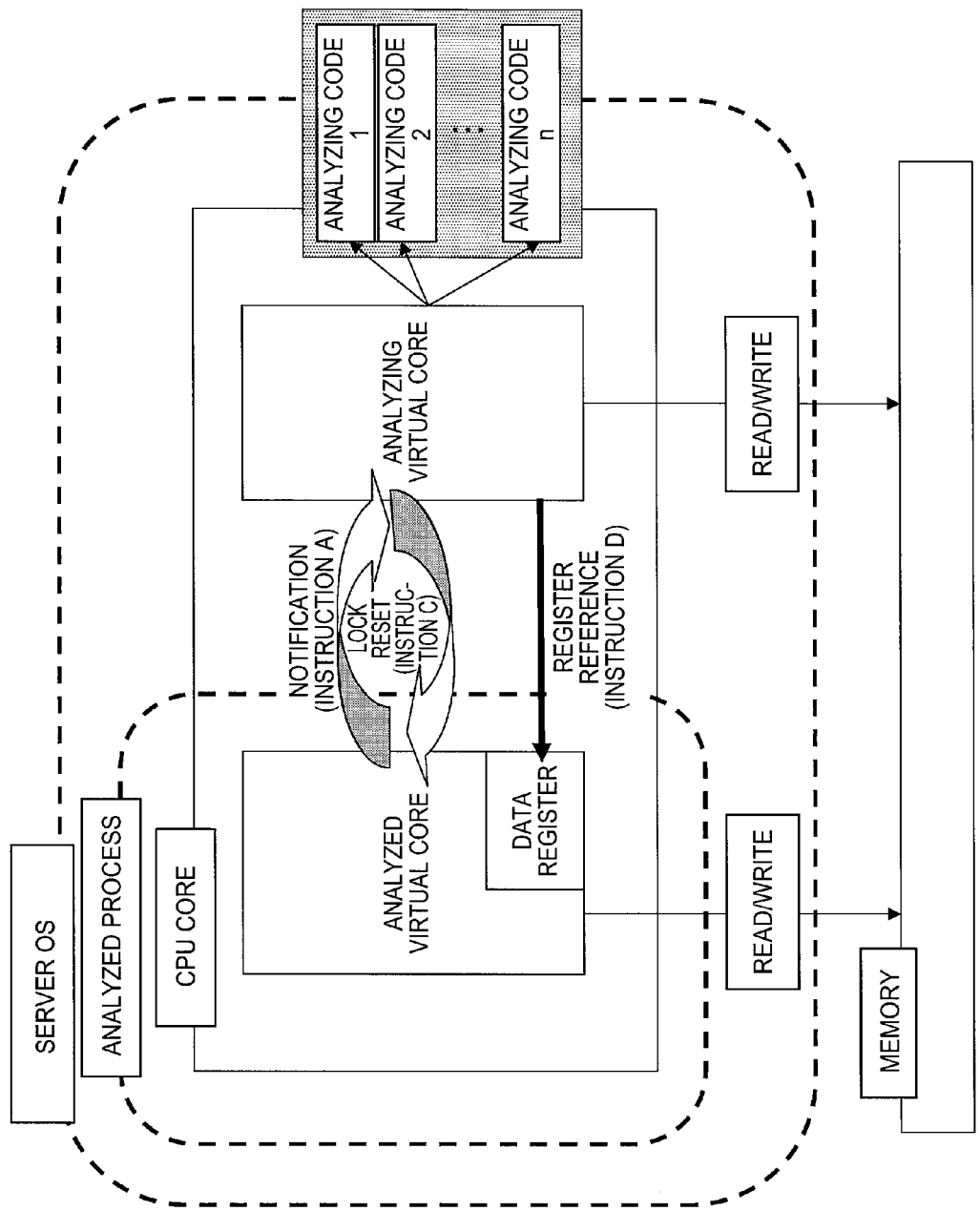
FIG. 7 is an explanatory diagram illustrating another processing operation form of operating the same OS on a plurality of virtual cores.

Next, referring to FIGS. 5, 6, and 7, a description is given of processing operation examples. FIG. 5 illustrates a form in which different OSs are operated for respective virtual cores, and FIGS. 6 and 7 illustrate forms where the same OS is operated on both the virtual cores.

FIG. 5 is such a processing operation example that different OSs are operated on the analyzed virtual core and the analyzing virtual core. As describe before, the server OS is operated on the analyzed virtual core and the analyzing OS is operated on the analyzing virtual core by partitioning resources used respectively by these OSs by means of different ACPI tables to be used. Depending on the ACPI tables referred to by the respective OSs, the analyzed virtual core can read and write the memory (area) for the server OS core, but the analyzing virtual core is permitted only to read the memory (area) for the server OS core. Moreover, the analyzing virtual core can read/write the memory (area) for the analyzing OS for activating itself, but the area is not (cannot be) accessed by the analyzed virtual core.

FIG. 6 is such a configuration example that the analyzed virtual core and the analyzing virtual core operate under control of the same OS. An analyzing process resides on the analyzing virtual core, and analyzes programs operating on the analyzed core by means of the debug/trace. Software/hardware break points are set to the program operating on the analyzed core, and the program accepts the analysis from the analyzing core. The analyzed virtual core and the analyzing virtual core operate on the same OS, and can thus similarly read/write the memory.

FIG. 7 is another configuration example for operating the analyzed virtual core and the analyzing virtual core under control of the same OS. This architecture is different from that in FIG. 6, and has such a configuration that the analyzing process is not assigned on the analyzing virtual core in the fixed manner, and a code to be executed is registered in advance. An exception handler is registered so that when a debug exception occurs on the analyzed virtual core, the instruction A is issued, and when the notification is identified on the analyzing virtual core by the instruction A, an analyzing code is activated on the analyzing virtual core, thereby starting the analysis of the analyzed virtual core. A plurality of analyzing codes may be registered. The analyzing virtual core issues the instruction D to read contents of the instruction register and other registers from the analyzed virtual core, and switches the analyzing code to be executed depending on the content.

This configuration has such an advantage that the analyzing virtual core can be used for other processing when the analyzing code is not executed, resulting in no waste of resources. Therefore, the configuration is not only used for debugging but can be easily applied as program activation means based on event during a normal operation.

The respective architectures illustrated in FIGS. 5 to 7 are preferably used depending on a usage form. If the analysis subject is a kernel, the processing configuration of FIG. 5 in which even if the server OS fails and the operation is not available, the investigation from the analyzing OS operating independently of the server OS is available is preferred. If the analysis subject is a process, analysis of address arrangement and the like are easier if the virtual cores operate on the same OS, and hence the processing configuration of FIG. 6 or 7 is preferred.

When FIGS. 6 and 7 are compared with each other, FIG. 6 is suitable for a case where a debugger is executed on the analyzing virtual core for interactive analysis, and FIG. 7 is suitable for a case where what is to be executed is determined in advance and it is preferred that the processing be automatically carried out when a break point is reached.

[Description of Processing Operation]

Referring to FIGS. 8 to 12, a description is given of the processing operation.

Referring to FIGS. 8A and 8B, a description is given of an operation for debug in a case where the verification according to this invention is not used (the reference instruction according to this invention is not used) for comparison. In an illustrated method, the analysis processing is carried out from the core executing a program for the analysis itself or from a physically different core.

In FIGS. 8A and 8B, when a break point is reached, a context switch is carried out on a core executing a program to save registers, and the debugger is started.

Subsequent processing is branched to FIG. 8A or 8B depending on whether the core subject to the analysis processing is the same as the core executing the program or not.

When the analysis is carried out by the core itself which has executed the program, as illustrated in FIG. 8A, the program is stopped for a long period until the analysis processing is finished, and after the analysis processing is finished, the context switch is carried out again to resume the program.

When the analysis is carried out from a physically different core, as illustrated in FIG. 8B, the program subject to the analysis can resume the operation to continue the processing in parallel with the analysis processing. However, in order to pass the saved register information to the core which is to carry out the analysis processing, the synchronization and the transfer between different cores are still required. This processing is processing higher in cost in various points than the cost for the synchronization and the transfer between virtual cores on the same physical core.

Figure 9:
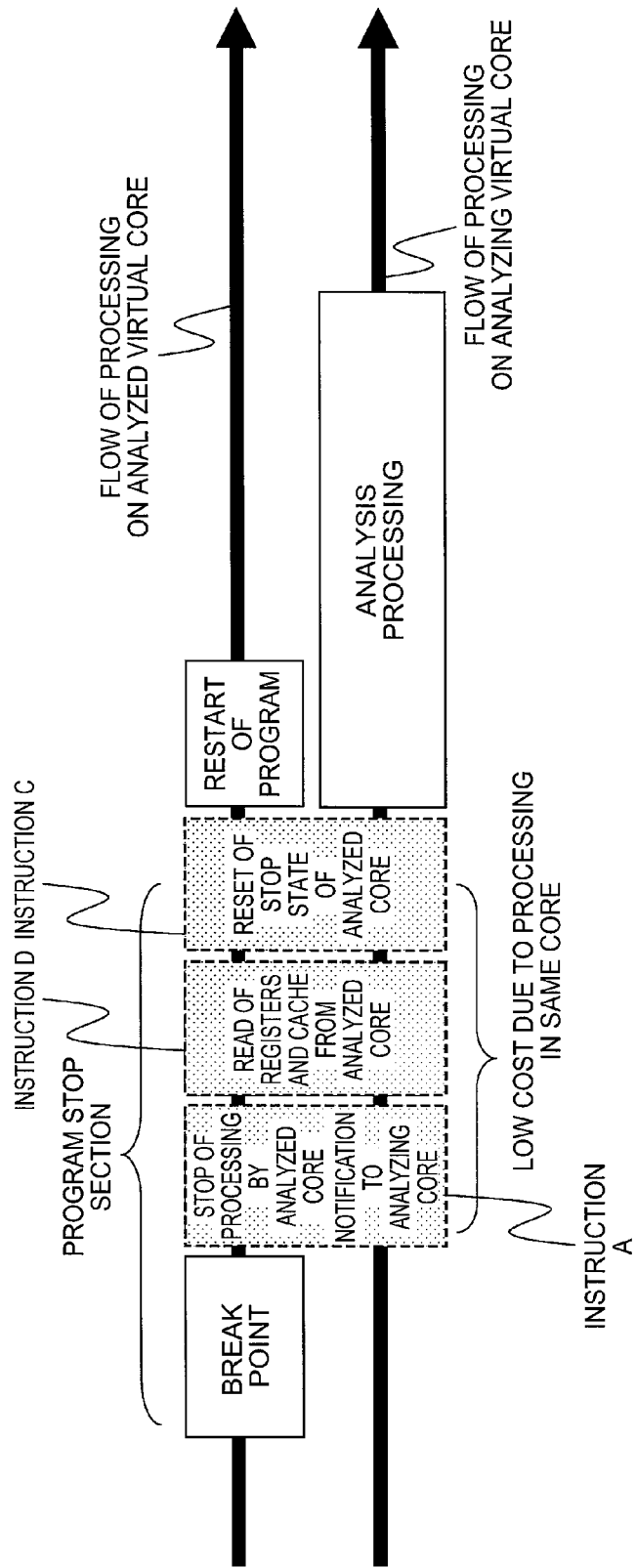
FIG. 9 is an explanatory diagram illustrating an example of the debug processing operation flow in an implementation example of CPU instructions illustrated in FIG. 4.

Referring to FIG. 9, a description is given of basic processing in an instruction implementation example. This method is the same as the above-mentioned method up to the stop of the operation of the program at the break point. Then, after the operation of the analyzed virtual core is stopped by the instruction A instead of activating the debugger, the analyzing virtual core is notified of the state where the registers can be referred to. The analyzing virtual core, which has received the notification, reads the register information by means of the instruction D, and then resumes the processing of the analyzed virtual core by means of the instruction C.

The series of processing can be carried out at a low cost and a high speed by providing such a configuration that the necessity for the context switch and the activation of the debugger on the analyzed core are eliminated, and the necessity for synchronization and the data transfer between physical cores are also eliminated.

Figure 10:
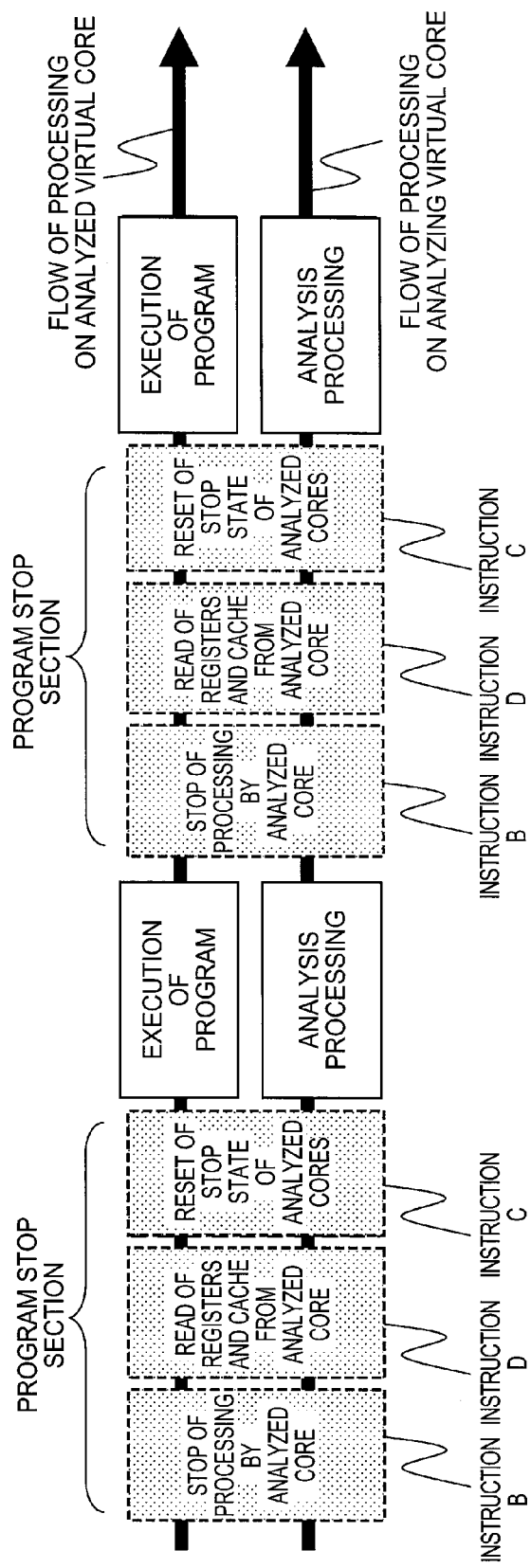
FIG. 10 is an explanatory diagram illustrating an example of a simple trace processing operation flow in the implementation example of the CPU instructions illustrated in FIG. 4.

Referring to FIG. 10, a description is given of a processing operation example of carrying out a simple trace. The processing illustrated in FIG. 9 starts the analysis processing when the analyzed core reaches a break point. On the other hand, in the processing illustrated in FIG. 10, the analysis processing starts from the analyzing virtual core side. The analyzing virtual core can monitor the operation of the analyzed core by periodically reading the instruction register of the analyzed core, thereby determining which part of the processing in a program flow is currently carried out by means of the sampling.

The processing is processing on the same physical core, and has such an advantage that the influence on the program operating on the analyzed core can be limited to an extremely small amount.

Figure 11:
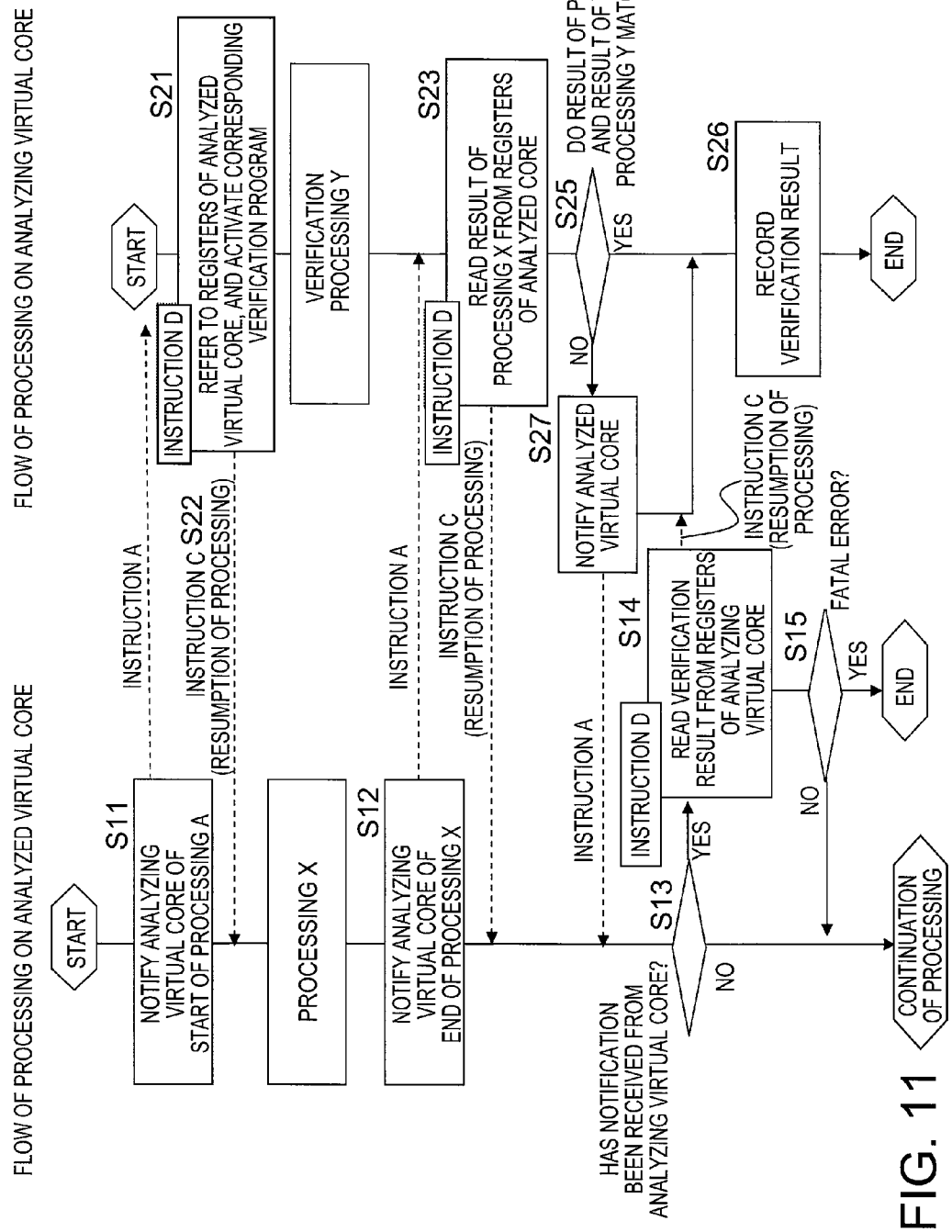
FIG. 11 is an explanatory diagram illustrating an example of parallel verification processing in the implementation example of the CPU instructions illustrated in FIG. 4.

FIG. 11 illustrates a flowchart of a processing example of parallel verification processing. Such an example that the analyzed virtual core and the analyzing virtual core mutually refer to register information is illustrated in the parallel verification processing, and the analysis function is set to Enable on both the virtual cores.

A program, which is caused to carry out certain processing and to simultaneously carry out related and independent processing such as verifying whether a processing result is appropriate or not and generating an encryption key depending on a processing content, exists in various programs.

A parallel program using the register reference function according to this invention as a low-cost communication means can be generated for such a program.

FIG. 11 illustrates processing timings on each of the virtual cores when execution of processing X itself to be verified and verification processing Y for verifying a result of the processing X are carried out as parallel processing.

On the analyzed virtual core, a break point is set to a start portion of the processing X in advance, and then the program is started. When the break point is reached on the analyzed virtual core, the arrival is notified to the analyzing virtual core by means of the instruction A (S11).

Then, the registers of the analyzed virtual core are read from the analyzing virtual core by means of the instruction D, and concurrently, a verification program corresponding to the ongoing processing is activated (S21). On this occasion, data required for the verification processing Y is also read from registers of the analyzed virtual core and the memory cache.

Then, the instruction C resets the stop state of the analyzed virtual core (S22), and, as a result, the respective virtual cores carry out the processing X and the verification processing Y in parallel.

When the processing X is completed on the analyzed virtual core, the instruction A is used again to notify the analyzing virtual core of the completion (S12).

The analyzing virtual core acquires a result of the processing X by means of the instruction D (S23), and carries out the instruction C to resume the processing of the analyzed virtual core (S24).

Then, results of the processing X and the verification processing Y are compared with each other on the analyzing virtual core as the verification processing (S25). When the results match each other in the comparison, only the result is recorded on the analyzing virtual core (S26), the verification processing on the analyzing virtual core is finished, and the program on the analyzed virtual core continues the processing without interference. On the other hand, when the results do not match each other in the comparison, the analyzing virtual core notifies the analyzed virtual core of the inconsistency by means of the instruction A (S27).

The analyzed virtual core identifies the reception of the notification about the inconsistency in the comparison result (S13), and reads a verification result from a resistor of the analyzing virtual core by means of the instruction D (S14). The analyzed virtual core determines whether to continue the processing or not depending on the read content (S15).

The notification of the event and the transfer of the data are carried out without a data transfer via a memory such as the inter-process communication in the parallel processing, resulting in a high-speed parallel processing program.

Figure 12:
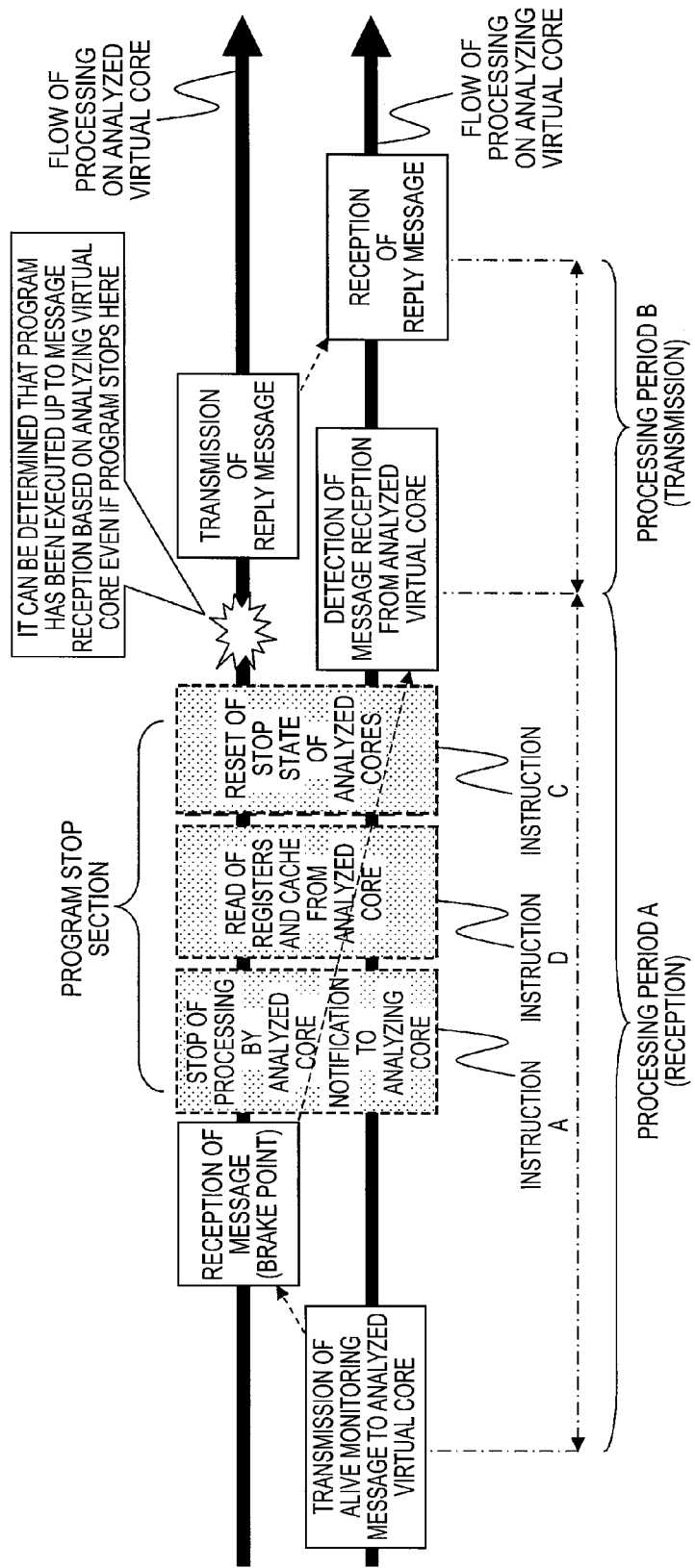
FIG. 12 is an explanatory diagram illustrating an example of a parallel verification processing operation flow in the implementation example of the CPU instructions illustrated in FIG. 4.

The parallel processing illustrated in FIG. 12 is an embodiment mode of alive monitoring of an analyzed program, and diagnosis of a performance bottleneck. In general, the alive monitoring of a program is carried out by a periodic log left by the program itself, or transmission/reception of a message to/from an external program. However, even when the periodic monitoring fails, it is often difficult to understand from the outside where the program stops.

In the CPU according to this invention, break points can be dynamically set at arbitrary locations, and the operation can be analyzed while the influence on a subject program is minimized. Therefore, where the program stops as well as which processing takes time can be investigated.

First, a break point is set to an arbitrary location at which the performance bottleneck needs to be monitored in a subject program to be analyzed. In FIG. 12, a break point is set for reception processing of an alive monitoring message. When a message for the alive monitoring is sent from the analyzing virtual core to the subject program, a debug exception occurs on the analyzed virtual core, and a notification is sent to the analyzing virtual core by means of the instruction A. When this notification arrives, the analyzing virtual core can recognize that the subject program has received the message, and when this notification does not arrive, the analyzing virtual core can determine that the alive monitoring message has been lost in the course, or the analyzed program is in a state where the analyzed program cannot carry out the reception processing for the message. After the reception of the message, the subject program transmits a reply message to the alive monitoring message. When the notification has arrived, but the reply message does not arrive, the analyzing virtual core can determine that a cause for stop has occurred therebetween.

In the CPU according to this invention, the register information can be read by executing several CPU instructions between the virtual cores on the same physical core without generating a context switch, and thus there is only influence at a level which the subject program hardly detects. Therefore, the time taken by the processing can be measured highly accurately. As a result, recording of times at the respective points when the alive monitoring message is transmitted, when the reception of the message by the analyzed program is detected by means of the instruction A, when the replay message is received, and the like enables to recognize which part takes time. Thus, the CPU according to this invention can also be applied to the investigation of the performance bottleneck.

[Description of Effects]

Now, some effects which can be provided by an information processing apparatus such as a server using the central processing unit according to this invention are exemplified.

The first effect is that the debug trace can be carried out with little influence on a program in operation. This is because the necessity for the context switch and the debugger activation on the virtual core which is executing a program is eliminated by operating a debugger on a different neighboring virtual core on the same physical core, and the cost for the register reference and the synchronization between the virtual cores is small, resulting in an extremely small overall overhead.

The second effect is that the real-time trace is realized without necessity of special hardware such as the JTAG and the ICE. This is because a neighboring virtual core usually has, because of its characteristics, a performance of operating at the same speed/frequency of a virtual core subject to the analysis, the register reference between the virtual cores can be controlled by a program according to this invention, and thus functional requirements required for the real time trace is simultaneously satisfied.

The third effect is that the parallel processing by using the high-speed data transfer by means of the register reference function is realized. This is because the event notification between the virtual cores and the data transfer by means of the register reference are carried out only by the several CPU instructions at a low cost without necessity of synchronization between different physical cores and low-speed inter-process communication means including a data transfer via a main memory.

Moreover, the effect on the related arts is as follows. CPU apparatus described in Japanese Patent No. 3206960 and Japanese Unexamined Patent Application Published (JP-A) No. 2003-085124 can read register information copied to a different area from the outside of the chip in advance. However, because the register value referenced by this method is a past content, even if next analysis processing based on the read content is carried out, the CPU is executing subsequent processing at this time point, and the CPU apparatus cannot be used for real time debugging.

In contrast, in this invention, the register information is read between the virtual cores sharing the execution pipeline, and hence the synchronization can be easily carried out so that the other virtual core (thread) is stopped for a short period, thereby preventing the update of the register during the reading, and the register can be referred to at a low cost without a copy area. As a result, the debug/trace having an increased real-time property can be realized.

Moreover, this invention is useful for analyzing a kernel. This is because even if the OS operating on the virtual core for server OS is restricted in operation due to the ongoing startup or ongoing stall, a behavior of the kernel subject to analysis can be investigated via the OS independently operating on the analyzing virtual core for analysis.

Moreover, a program and a kernel can be analyzed and debugged at a finer granularity.

As described above, this invention can provide the central processing unit and the information processing apparatus which can acquire the information on the register used by the virtual core at a low overhead, thereby verifying the processing operation of the subject program in operation.

Moreover, this invention can provide the intra-virtual-core register value acquisition method for acquiring the information on the register used by the predetermined virtual core by means of the internal operation of the central processing unit with a low overhead, and the verification method for a program which uses the method.

Moreover, the instruction group data and the analyzing program according to this invention may be recorded in a fixed manner in a recording medium to be distributed. The program recorded in the recording medium is read wirelessly, wiredly, or via the recording medium itself into a memory, thereby operating a control part or the like. The examples of the medium include an optical disc, a magnetic disk, a semiconductor memory apparatus, and a hard disk.

The embodiment has been illustrated and described above, but changes such as separation and merging of the block components, a change in number of parallel components, a switch of processing steps, and the like can be freely carried out as long as the purport and the above-mentioned functions of this invention are satisfied, and do not limit this invention.

Further, part or whole of the above-mentioned embodiment can also be described as follows. Note that, the following supplementary notes are not intended to limit this invention.

[Supplementary Note 1]

A central processing unit capable of building a plurality of virtual cores on a physical core, including:

means for executing, on an own virtual core, or causing another virtual core on the same physical core to execute, a reference instruction of directly referring to a current register value used by an arbitrary virtual core from the another virtual core without influence on an execution context of the arbitrary virtual core; and means for switching a permission for executing the reference instruction of referring to the register value among the plurality of virtual cores.

[Supplementary Note 2]

A central processing unit according to the above-mentioned supplementary note, further including means for executing, on the own virtual core, or causing the another virtual core to execute, a reference preparation instruction of stopping processing on the own virtual core or the another virtual core which can cause a change in a register value possibly referred to by the reference instruction.

[Supplementary Note 3]

A central processing unit according to the above-mentioned supplementary note, further including means for executing, on the own virtual core, or causing the another virtual core to execute, a reference preparation reset instruction of resetting a stop state of the virtual core stopped by the reference preparation instruction.

[Supplementary Note 4]

A central processing unit according to the above-mentioned supplementary note, further including means for executing, on the own virtual core, or causing another virtual core belonging to the same physical core to execute, when a notification is received from the another virtual core, a setting instruction of setting a point for individually executing or cooperating the reference instruction, the reference preparation instruction, and the reference preparation reset instruction to a debug register of the own virtual core.

[Supplementary Note 5]

A central processing unit having such a configuration that a plurality of virtual cores are implementable on a single physical core, and each register built in the physical core operates faster than a data transfer to an external memory component, the central processing unit including:

means for executing, on an own virtual core, or causing another virtual core on the same physical core to execute, a reference instruction of directly referring to a current register value relating to an execution of a program to be operated on a virtual core subject to analysis from the another virtual core without influence on an execution context of the virtual core subject to the analysis;

means for executing, on the own virtual core, or causing the another virtual core to execute, a reference preparation instruction of stopping processing on the own virtual core or the another virtual core which can cause a change in a register value possibly referred to by the reference instruction;

means for executing, on the own virtual core, or causing the another virtual core to execute, a reference preparation reset instruction of resetting a stop state of the virtual core stopped by the reference preparation instruction;

means for executing, on the own virtual core, or causing another virtual core belonging to the same physical core to execute, when a notification is received from the another virtual core, a setting instruction of setting a point for individually executing or cooperating the reference instruction, the reference preparation instruction, and the reference preparation reset instruction to a debug register of the own virtual core; and means for switching a permission for executing the reference instruction of referring to the register value among the plurality of virtual cores.

[Supplementary Note 6]

A central processing unit according to the above-mentioned supplementary note, in which the central processing unit has a function of partitioning the same physical core on which respective virtual cores that execute, or are caused to execute, each of the reference instruction, the reference preparation instruction, and the reference preparation reset instruction are built, thereby assigning a hardware resource to the respective virtual cores, and operating independent OSs.

[Supplementary Note 7]

A central processing unit according to the above-mentioned supplementary note, in which the central processing unit has a function of operating an OS across virtual cores for passing/receiving each of the reference instruction, the reference preparation instruction, and the reference preparation reset instruction.

[Supplementary Note 8]

An information processing apparatus, including the central processing unit according to the above-mentioned supplementary note installed therein, the information processing apparatus being configured to execute any one of or a combination of analysis, debug, and parallel processing by using, for a program as a subject, which uses at least one, which is equal to or less than a maximum number of the virtual cores, of the plurality of virtual cores on the same physical core as a program execution entity, from an OS operating while considering at least one of the plurality of virtual cores as an execution entity, a reference instruction of directly referring to a current register value used by an arbitrary virtual core from another virtual core on the same physical core without influence on at least the execution context of an arbitrary virtual core.

[Supplementary Note 9]

A BIOS system, which is configured to generate different ACPI tables, which enable partitioning so that different OSs can be activated on the respective virtual cores in the physical core in the central processing unit according to the above-mentioned supplementary note.

[Supplementary Note 10]

A method of acquiring a register value in a virtual core by means of an internal operation of a central processing unit, the method including, in an environment in which a plurality of virtual cores are built on a single physical core:

enabling a setting of possibly providing another virtual core belonging to the same physical core with a permission of referring to a register used by an arbitrary virtual core; and executing, by another arbitrary virtual core belonging to the same physical core, a reference instruction of directly referring to a current register value used by the arbitrary virtual core from another virtual core on the same physical core without influence on an execution context of the arbitrary virtual core, thereby identifying, by the another arbitrary virtual core, the referenced current register value used by the arbitrary virtual core.

[Supplementary Note 11]

A method of acquiring a register value in a virtual core according to the above-mentioned supplementary note, further including executing, on the own virtual core, or causing another virtual core to execute, before the reference instruction, a reference preparation instruction of stopping processing on the own virtual core or the another virtual core which can cause a change in a register value possibly referred to by the reference instruction.

[Supplementary Note 12]

A method of acquiring a register value in a virtual core according to the above-mentioned supplementary note, further including executing, on the own virtual core, or causing another virtual core to execute, after the reference instruction, a reference preparation reset instruction of resetting a stop state of the virtual core stopped by the reference preparation instruction.

[Supplementary Note 13]

A method of acquiring a register value in a virtual core according to the above-mentioned supplementary note, further including using executing, on the own virtual core, or causing another virtual core belonging to the same physical core to execute, when a notification is received from the another virtual core, a setting instruction of setting a point for individually executing or cooperating the reference instruction, the reference preparation instruction, and the reference preparation reset instruction to a debug register of the own virtual core for setting a condition for executing the reference instruction.

[Supplementary Note 14]

A verification method for a program, including:

building a plurality of virtual cores on a single physical core, and enabling a setting of possibly providing another virtual core belonging to the same physical core with a permission for referring to a register used by an arbitrary virtual core;

in an environment in which the plurality of virtual cores are built on the single physical core and the setting is enabled, executing, for a program as a subject, which uses at least one, which is equal to or less than a maximum number of virtual cores, of the plurality of virtual cores on the same physical core as a program execution entity, from an OS operating while considering at least one of the plurality of virtual cores as an execution entity, a reference instruction of directly referring to a current register value used by an arbitrary virtual core from another virtual core on the same physical core without influence on at least an execution context of the arbitrary virtual core; and executing any one or a combination of analysis, debug, and parallel processing by using the register value of the virtual core acquired by using the reference instruction.

[Supplementary Note 15]

A verification method for a program according to the above-mentioned supplementary note, further including executing, on the own virtual core, or causing another virtual core to execute, before the reference instruction, a reference preparation instruction of stopping processing on the own virtual core or the another virtual core which can cause a change in a register value possibly referred to by the reference instruction.

[Supplementary Note 16]

A verification method for a program according to the above-mentioned supplementary note, further including executing, on the own virtual core, or causing another virtual core to execute, after the reference instruction, a reference preparation reset instruction of resetting a stop state of the virtual core stopped by the reference preparation instruction.

[Supplementary Note 17]

A verification method for a program according to the above-mentioned supplementary note, further including using executing, on the own virtual core, or causing another virtual core belonging to the same physical core to execute, when a notification is received from the another virtual core, a setting instruction of setting a point for individually executing or cooperating the reference instruction, the reference preparation instruction, and the reference preparation reset instruction to a debug register of the own virtual core for setting a condition for executing the reference instruction.

This invention can be used for verification of various programs such as debug of a kernel and an application, investigation of a performance bottleneck, a diagnosis of a server program, alive monitoring, and high-speed parallel verification processing by using register reference.

What is claimed is:

1. A central processing unit capable of building a plurality of virtual cores on a physical core, comprising:

an element for executing, on an own virtual core, or causing another virtual core on the same physical core to execute, a reference instruction of directly referring to a current register value used by a selected one of the virtual cores executing any program from the another virtual core without influence on an execution context of the selected one of the virtual cores; and an element for giving a permission for executing the reference instruction of referring to the register value among the plurality of virtual cores;

wherein the central processing unit further comprises:

an element for executing, on the own virtual core, or causing the another virtual core to execute, a reference preparation instruction of stopping processing on the own virtual core or the another virtual core, which causes a change in a register value possibly referred to by the reference instruction.

2. The central processing unit according to claim 1, further comprising an element for executing, on the own virtual core, or causing the another virtual core to execute, a reference preparation reset instruction of resetting a stop state of the virtual core stopped by the reference preparation instruction.

3. The central processing unit according to claim 2, further comprising an element for executing, on the own virtual core, or causing another virtual core belonging to the same physical core to execute, when a notification is received from the another virtual core, a setting instruction of setting a point to a debug register of the own virtual core, said setting instruction individually executing or cooperating the reference instruction, the reference preparation instruction, and the reference preparation reset instruction.

4. The central processing unit according to claim 1, wherein the central processing unit has a function of partitioning the same physical core on which respective virtual cores that execute, or are caused to execute, each of the reference instruction, the reference preparation instruction, and the reference preparation reset instruction are built, each virtual core being assigned with a hardware resource and operating independent OSs.

5. A central processing unit having such a configuration that a plurality of virtual cores are implementable on a single physical core, and each register built in the physical core operates faster than a data transfer to an external memory component, the central processing unit comprising:

an element for executing, on an own virtual core, or causing another virtual core on the same physical core to execute, a reference instruction of directly referring to a current register value relating to an execution of a program to be operated on a virtual core subject to analysis from the another virtual core without influence on an execution context of the virtual core subject to the analysis;

an element for executing, on the own virtual core, or causing the another virtual core to execute, a reference preparation instruction of stopping processing on the own virtual core or the another virtual core, which causes a change in a register value possibly referred to by the reference instruction;

an element for executing, on the own virtual core, or causing the another virtual core to execute, a reference preparation reset instruction of resetting a stop state of the virtual core stopped by the reference preparation instruction;

an element for executing, on the own virtual core, or causing another virtual core belonging to the same physical core to execute, when a notification is received from the another virtual core, a setting instruction of setting a point to a debug register of the own virtual core, said setting instruction individually executing or cooperating the reference instruction, the reference preparation instruction, and the reference preparation reset instruction; and an element for giving a permission for executing the reference instruction of referring to the register value among the plurality of virtual cores.

6. An information processing apparatus, comprising a central processing unit installed therein, the information processing apparatus being configured to execute any one of or a combination of analysis, debug, and parallel processing by the use of a reference instruction of directly referring to a current register value used by a virtual core from any other virtual core on the same physical core;

wherein the central processing unit capable of building a plurality of virtual cores on a physical core comprises:

an element for executing, on an own virtual core, or causing another virtual core on the same physical core to execute, a reference instruction of directly referring to a current register value used by a selected one of the virtual cores executing any program from the another virtual core without influence on an execution context of the selected one of the virtual cores; and an element for giving a permission for executing the reference instruction of referring to the register value among the plurality of virtual cores; and wherein the analysis, debug, and parallel processing are executed by an OS carried out by the virtual core in connection with an analyzed program which is executed in the virtual core on the same physical core.

* * * * *